United States Patent [19]
Cummins et al.

[11] Patent Number: 5,901,298
[45] Date of Patent: May 4, 1999

[54] METHOD FOR UTILIZING A SINGLE MULTIPLEX ADDRESS BUS BETWEEN DRAM, SRAM AND ROM

[75] Inventors: T. Scott Cummins, Phoenix; David M. Puffer, Tempe; Michael F. Cole; Scott A. Goble, both of Chandler, all of Ariz.; Bruce A. Young, Tigard, Oreg.

[73] Assignee: Intel Corporation, Santa Clara, Calif.

[21] Appl. No.: 08/726,700

[22] Filed: Oct. 7, 1996

[51] Int. Cl.$^6$ .................................................. G06F 13/00
[52] U.S. Cl. ............................ 395/306; 711/5; 395/858
[58] Field of Search .............................. 395/306, 308, 395/309, 858; 711/5

[56] References Cited

U.S. PATENT DOCUMENTS

| | | | |
|---|---|---|---|
| 4,903,197 | 2/1990 | Wallace et al. .............................. | 711/5 |
| 5,386,579 | 1/1995 | Bourekas et al. ......................... | 395/800 |
| 5,473,573 | 12/1995 | Rao ........................................ | 365/230.1 |
| 5,490,253 | 2/1996 | Laha et al. ................................ | 395/304 |
| 5,497,355 | 3/1996 | Mills et al. .......................... | 365/230.08 |
| 5,579,277 | 11/1996 | Kelly ....................................... | 365/230.2 |
| 5,584,010 | 12/1996 | Kawai et al. ............................. | 395/444 |
| 5,590,287 | 12/1996 | Zeller et al. .............................. | 395/307 |
| 5,608,892 | 3/1997 | Wakerly .................................... | 395/445 |
| 5,652,912 | 7/1997 | Lofren et al. ............................. | 395/841 |
| 5,696,917 | 12/1997 | Mills et al. ................................ | 395/855 |

*Primary Examiner*—Glenn A. Auve
*Attorney, Agent, or Firm*—Blakely, Sokoloff, Taylor & Zafman LLP

[57] ABSTRACT

A memory interface device for interfacing between the local bus and a memory bus. The memory bus is coupled to a static memory and a dynamic memory. The interface device includes first and second internal buses coupled to a selecting device. The selecting device selectively couples one of the first and second internal buses to the memory bus. The memory interface device further includes an interface control unit having an input coupled to the local bus for receiving address and control signals. The interface control unit further has an output, coupled to the first internal bus for generating gating each data transfer in the burst in response to the address and control signals.

28 Claims, 8 Drawing Sheets

METHOD FOR UTILIZING A SINGLE MULTIPLEX ADDRESS BUS BETWEEN DRAM, SRAM AND ROM

BACKGROUND OF THE INVENTION

(1) Field of the Invention

The present invention relates to the field of computer systems. More specifically, the present invention relates to a memory interface for interfacing between a local bus and a memory bus.

(2) Description of Related Art

Typically, computer systems utilize two address buses between a processor and a memory subsystem. One address bus is coupled to a static memory subsystem such as SRAM and ROM and the other address bus is coupled to a dynamic memory subsystem such as DRAM. Part of the reason for this implementation is that SRAM access requires only one address phase whereas DRAM access requires two address phases i.e., a phase in which the row address is asserted, and a second phase in which the column address is asserted. In other words, DRAM memories require a multiplexed address bus for rows and columns. Moreover, dynamic memory systems can be endowed with an interleaved memory scheme which provides even and odd memory banks. An interleaved bank is defined as a contiguous block of memory having independent odd and even leaves. Interleaving the odd and even leaves allows for higher system performance by overlapping CAS# (column address strobe) access times between leaves. Current memory controllers rely on separate even and odd address buses to support the dual leaves of an interleaved dynamic memory system. However, this addressing scheme that utilizes two address busses negatively impacts on the size of the chip and also requires a higher number of pins.

Furthermore, prior art systems are limited in their ability to implement long burst transactions as they provide at most the capability of transferring four words (1 quad word) during a burst transaction. These systems require thus for each quad word, an additional address phase, let alone additional recovery cycles and additional wait states between each shorter burst transaction. For computer systems using a Peripheral Component Interconnect (PCI) bus, which supports burst transactions of an extended length, it is desirable to provide an interface, between the PCI bus and the memory subsystem, which is capable of supporting long burst transactions without the overhead of asserting additional address phases and recovery cycles. The PCI bus is a high-speed I/O bus designed to define the interconnecting bus transfer protocol between highly-integrated peripheral adapters that are coupled to this bus. For more details regarding PCI system architecture, see PCI Local Bus Specification, Revision 2.1, of the PCI Special Interest Group of Portland, Oregon.

It is thus desirable to provide a computer system with a single address bus supporting both a static and a dynamic memory subsystem. Moreover, it is desirable to provide a single address bus which supports an interleaved dynamic memory system. It is also desirable to provide a memory interface supporting extended length burst transactions.

BRIEF SUMMARY OF THE INVENTION

The present invention provides a memory interface device with an interface control unit (ICU) for generating extended length burst transactions. More specifically, the present invention provides a memory interface device for interfacing between a first external bus and a second external bus coupled to a first local processor bus and second memory subsystems. The memory interface device includes first and second internal buses and a selecting device coupled to the first and second internal buses. The selecting device selectively couples one of the first and second internal buses to the second external bus. The memory interface device further includes an interface control unit (ICU) having an input, coupled to the first external bus, for receiving address and control signals from the first external bus. The ICU further includes an output, coupled to the first internal bus, for generating burst address signals in response to the address and control signals.

The present invention also provides a memory interface device for interfacing between a local bus and a memory bus coupled to a dynamic memory system including an even memory bank device and an odd memory bank device. The memory interface device includes an memory control unit (MCU) coupled to the local bus and to the memory bus, for generating memory bank select signals. The memory interface device further includes an interleave interface unit (IIU) having a control gate for receiving the memory bank select signals and in response to these signals for selectively coupling the memory bus to the even memory bank device or to the odd memory bank device.

BRIEF DESCRIPTION OF THE DRAWINGS

The objects, features and advantages of the present invention will become apparent to one skilled in the art from reading the following detailed description in which.

DETAILED DESCRIPTION OF THE INVENTION

In the following description, numerous specific details are set forth to provide a thorough understanding of the present invention. However, one having an ordinary skill in the art may be able to practice the invention without these specific details. In some instances, well-known circuits, structures, and techniques have not been shown in detail not to unnecessarily obscure the present invention.

Figure 1:
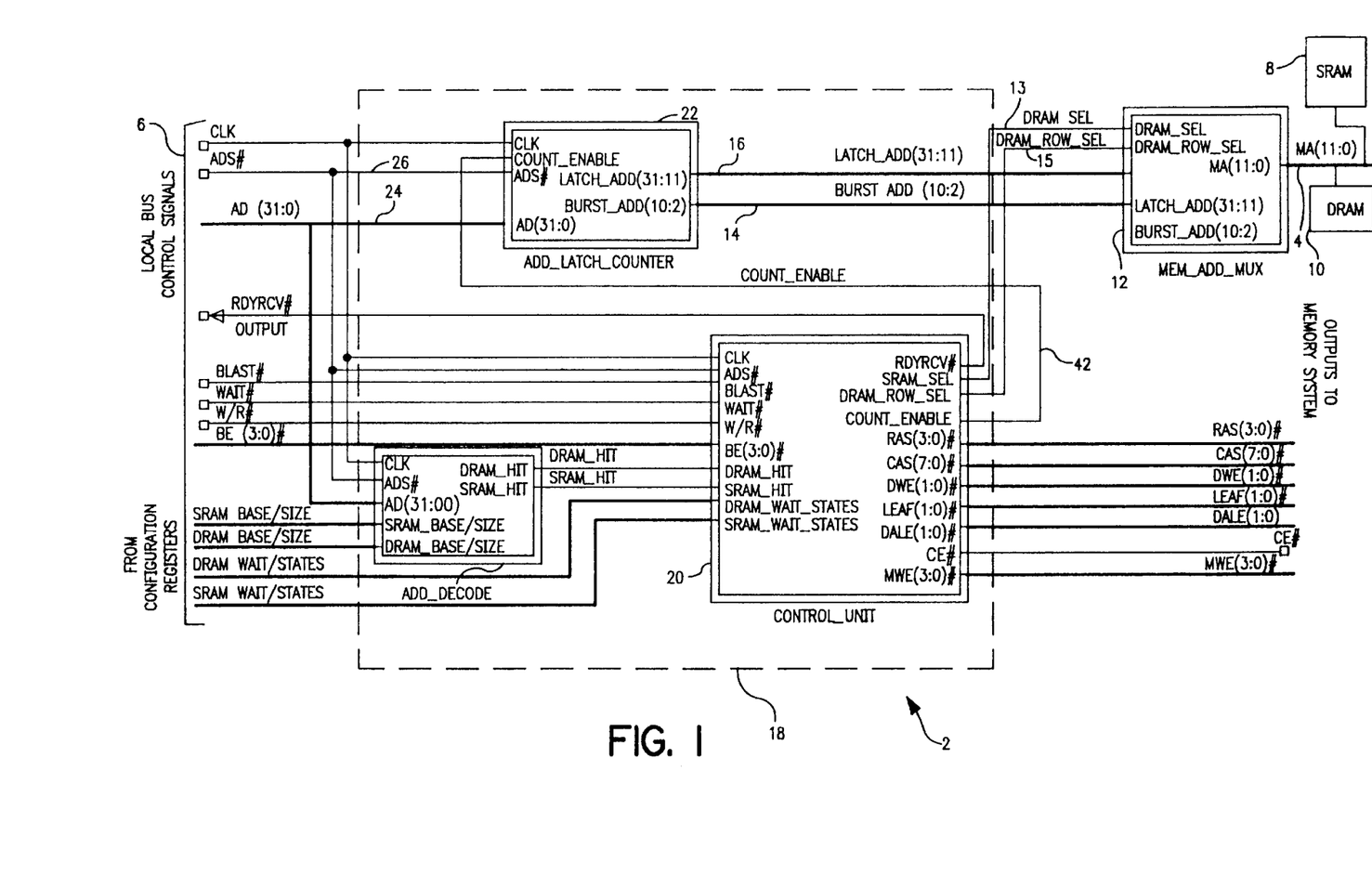
FIG. 1 shows a memory interface device according to the present invention.

FIG. 1 is a block diagram of the memory interface device according to the present invention. A memory interface 2 is coupled to a first external bus 6 and to a second external bus 4. The first external bus can be, by way of non-limiting example, a local bus of a 80960JX processor manufactured by Intel Corporation of Santa Clara, Calif. The second external bus 4 can be, by way of non-limiting example, a multiplex address (MA) bus. The memory address bus 4 is coupled to a static RAM memory, SRAM 8, and to a dynamic memory, DRAM 10. The memory interface device, according to the present invention, utilizes thus a single memory bus MA 4 for interfacing to two distinctly different memory subsystems, the dynamic memory subsystem DRAM 10, and the static memory subsystem SRAM 8.

Figure 3:
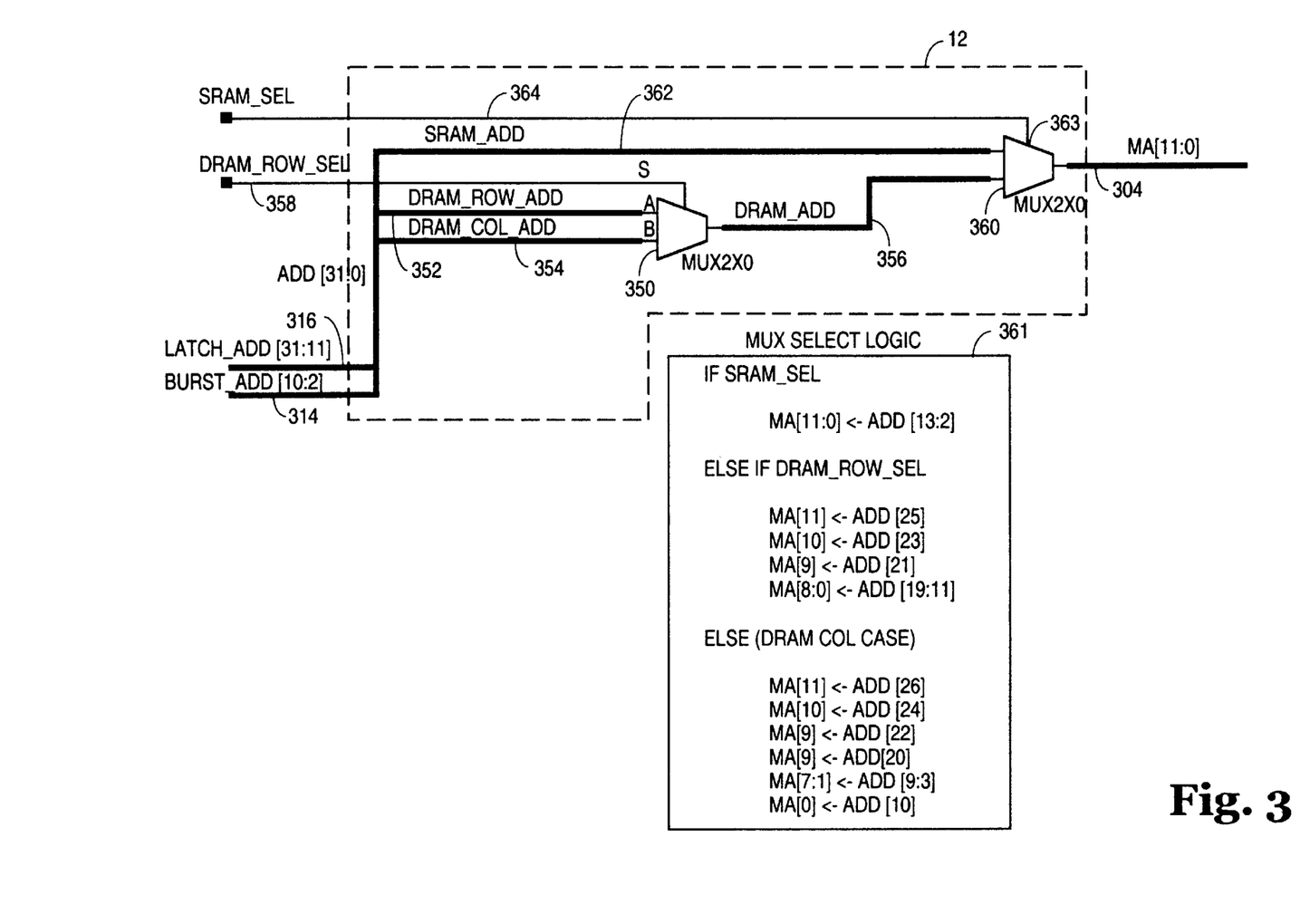
FIG. 3 shows a memory address multiplexing circuit of the memory interface device according to the present invention.

The memory interface device 2 includes a selecting device 12, which can include one or more multiplexers. The selecting device 12 has an output coupled to the MA bus 4. Selecting device 12 is also coupled at a first input thereof, to a first internal bus 14, and at a second input thereof to a second internal bus 16. The first internal memory bus 14 drives a burst address as generated by unit 22. The second internal memory bus 16 drives the upper bits of the latched address. This address is latched by unit 22 during the initial address phase of the local processor bus 24. The memory address multiplexer 12 uses the two control signals SRAM SEL 13 and DRAM ROW SEL 15 to determine which bits of the two internal memory busses 14 and 16 to multiplex into the external MA bus 4. The logic equations for this selection process are shown in FIG. 3. Accordingly, the static memory subsystem 8 or dynamic memory subsystem 10 can be addressed by driving the memory address bus 4 with a respective address when an interface control unit (ICU) 18 generates the signals SRAM SEL or DRAM ROW SEL.

The interface control unit 18 has an input (left side of this figure) coupled to local bus 6 for receiving address and control signals. The interface control unit 18 has an output (right side of the figure) coupled, among other things, to the first internal bus 14 and to the second internal bus 16. The interface control unit 18 can generate burst address signals via the first internal bus 14 in response to address and control signals received by the ICU 18 from the local bus 6.

The ICU 18 includes a control unit 20 which receives, from the local bus 6, local bus control signals which can be generated by a local bus master. Such signals include the signals BLAST#, WAIT#, W/R#, and BE(3:0)#. The ICU 18 also receives static configuration information through the inputs SRAM BASE/SIZE, DRAM BASE/SIZE, DRAM WAIT STATES and SRAM WAIT STATES. This configuration information is loaded into registers external to the ICU 18 on power-up initialization by the local processor.

The ICU 18 requires this configuration information for two reasons. First, it needs the BASE/SIZE signals to determine to which local addresses to respond to and whether it is accessing SRAM or DRAM. Second, it requires the configuration signals WAIT STATES to determine what speed grade memory components it is interfaced to. It uses this information to insert the appropriate number of wait states into each memory transaction. The control unit 20 also receives the signals DRAM HIT and SRAM HIT which indicate whether an access to the dynamic memory (DRAM) or to the static memory (SRAM) is desired. The signals received from local bus 6 are described in conjunction with TABLE 1.

TABLE 1

ICU Signal Description (Local Bus Signals)

| SIGNAL | DESCRIPTION |
|---|---|
| AD[31:0] | ADDRESS/DATA BUS carries 32-bit physical addresses to and from memory. During an address cycle, bits AD[31:2] contain a physical address. |
| ALE | ADDRESS LATCH ENABLE indicates the transfer of a physical address. ALE is asserted during an address cycle and deasserted before the beginning of the data cycle. |
| ADS# | ADDRESS/DATA STATUS indicates a valid address and the start of a new bus access. The processor asserts ADS# for the entire address cycle. The internal bus control logic samples ADS# at the beginning of the address cycle. |
| BE[3:0]# | BYTE ENABLES select which (byte(s) within the addressed word are accessed. |
| WIDTH/HLTD[1:0] | WIDTH/HALTED denotes the physical memory attributes for a bus transaction. |
| D/C# | DATA/CODE indicates whether a bus access is for data or instructions. |
| W/R# | WRITE/READ indicates the cycle is a write cycle or a read cycle. |
| DEN# | DATA ENABLE indicates data transfer cycles during a bus access. |
| BLAST# | BURST LAST indicates the last transfer in a bus access. |
| WAIT# | WAIT indicates additional wait states must be inserted by the Memory Controller during the current bus access. |
| LRDYRCV# | LOCAL READY/RECOVER indicates that data on the AD[31:0] bus is valid for a read, or that data has been accepted for a write. In addition, additional recovery cycles are inserted with this signal. |
| RDYRCV# | READY/RECOVER is an input controlled by an external memory controller and is not managed by the MC. |

Table 2 describes interface signals generated by the ICU.

TABLE 2

ICU Signal Description-Memory Interface Signals

| SIGNAL | DESCRIPTION |
|---|---|
| MA[11:0] | MEMORY ADDRESS BUS carries the multiplexed row and column addresses to the DRAM memory banks. During accesses to ROM, SRAM and Flash memory banks, the MA[11:0] address bus carries the lower twelve bits of the word address corresponding to A[13:2]. |
| RAS[3:0]# | ROW-ADDRESS STROBE signals indicate the presence of a valid row address on the MA[11:0] address bus. Each RAS# signal corresponds to a bank of DRAM memory. For non-interleaved DRAM, 1 to 4 banks of DRAM can be connected. For interleaved DRAM, one RAS# signal is used for each Leaf of DRAM (2 leaves/bank). |
| CAS[7:0]# | COLUMN-ADDRESS STROBE signals indicate the presence of a valid column address on the MA[11:0] address bus. The CAS[3:0]# signals are used for non-interleaved DRAM banks and Leaf 0 of interleaved banks, while CAS[7:4]# are used for Leaf 1 of interleaved banks. When non-interleaved DRAM is connected, CAS[7:4]# duplicate CAS[3:0]#. |
| MWE[3:0]# | MEMORY WRITE ENABLE signals provide the write strobe for the selected FLASH or SRAM memory bank. |
| DWE[1:0]# | DRAM WRITE ENABLE signals indicate the direction data to be transferred to/from DRAM and controls the WE# inputs on the DRAM devices. |
| DALE[1:0]# | DRAM ADDRESS LATCH ENABLE signals are used to control external address latches in an interleaved DRAM system. |
| CE[1:0]# | CHIP ENABLE signals are used to enable the ROM and SRAM devices during a memory address. |
| LEAF[1:0]# | LEAF signals are used to control interleaved DRAM banks. The signals are used for controlling the output enable on the data transceivers. |
| DP3:0 | DATA PARITY bits provide a parity bit for each byte of data in the DRAM banks. During a memory write access, the parity bits are written to the memory along with their corresponding data bytes. During a memory read access, the parity bits are used along with their respective data bytes to detect a parity error. |

A count enable signal generated by the control unit 20 is driven to the burst address counter 22 via line 42. Burst address counter 22 includes an address latch coupled to the AD bus 24 for latching an address signal from the local bus when the signal ADS# is asserted on line 26. The burst address counter 22, in response to the count enable signal, generates incremented burst address signals to the first internal bus 14. The burst address counter will be explained in more detail in conjunction with FIG. 2.

Figure 2:
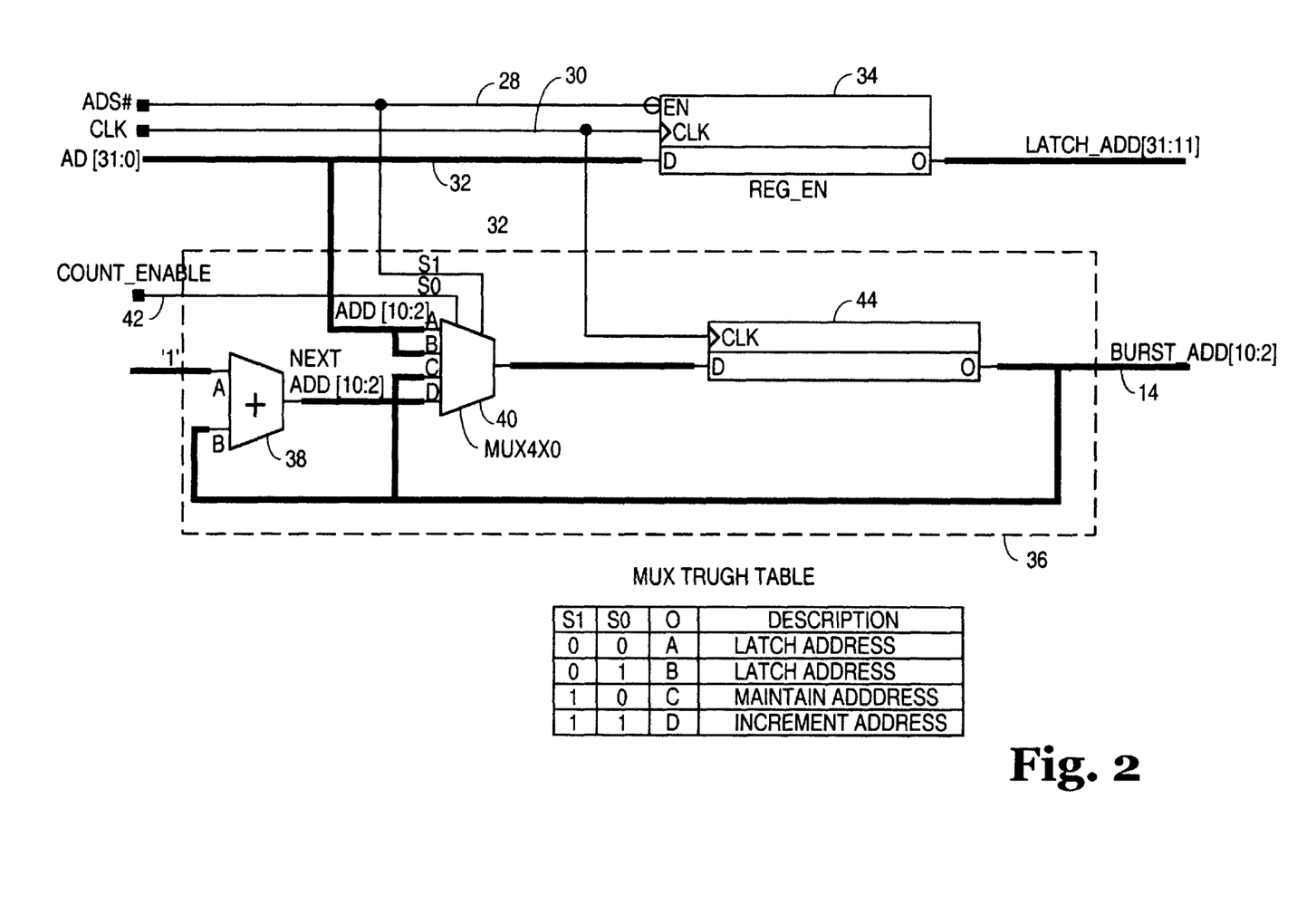
FIG. 2 shows a burst circuit of the memory interface device according to the present invention.

FIG. 2 diagrammatically illustrates the internal structure of the burst address counter 22. The burst address counter 22 includes address latch 34 coupled to an ADS# line 28, to a clock line 30, and to the AD bus 32. Each of these lines and the AD bus 32 are included in local bus 6. Address latch 34 is a 21-bit latch which typically captures a 21-bit address driven via the bus 32 to the input of the latch when the ADS# signal, driven via line 38, is asserted. An address counter 36 (shown in dotted line) is coupled to latch 34 for generating burst address signals. Burst address counter 36 is an up counter which can count up to $2^{12}$ bytes. The burst address counter 22 is a 9 bit counter which can count from 0 to $(2^{10}-1)$. Each count indicates a new word (4 bytes) address. In such a manner, this counter is used to access a burst length of up to 4K bytes. Accordingly, the memory interface according to the present invention supports burst transactions up to the length of $2^{12}$ bytes. The burst address counter is a preloadable up counter which drives the current burst address out to the first internal bus 14.

The burst address counter device 36 has an input coupled via the count enable line 42 to a burst control circuit (integrated in the control unit 18). The burst control circuit can be supported, by way of non-limiting example, by a burst state machine. The burst state machine tracks the state of the local bus master processor via control signals received at the input of control unit 20. The burst state machine typically determines whether the local bus is in an address, data, or idle phase, and according to these states, it determines when it is required to increment the burst address counter 36 by asserting the count enable signal.

Burst address counter 36, in this particular embodiment, includes an adder 38 having an input for receiving an address and a second input for receiving the value '1.' The input receiving the value '1' serves the purpose of incrementing the address received at the other input by having the adder 38 add the value 1 to the respective address. The incremented address is output by the adder 38 to a multiplexer 40. Multiplexer 40 is a 4×1 multiplexer having four inputs and an output. The output of multiplexer 40 is connected to register 44. Register 44 stores the current burst address which is driven to the first internal bus 14 via an output Q of the latch. The following table describes the operation of the multiplexer 40 according to inputs A, B, C, D and select signals S0 and S1.

Mux Truth Table

| ADS# | COUNT ENABLE | 0 | DESCRIPTION |
|---|---|---|---|
| 0 | don't care | A | Latch Address |
| 0 | don't care | B | Latch Address |
| 1 | 0 | C | Maintain Address |
| 1 | 1 | D | Increment Address |

The register 44 initially stores the address presented on the AD bus 32 during an address phase. As one can see from the multiplexer table, an address is stored by the register 44 whenever the ADS# signal is set to zero. In this instance, multiplexer 40 selects the input A to the multiplexer and routes this input to the output of the multiplexer thereby driving the register 44 with an address. Input A of the multiplexer is coupled to bits 2–10 of the AD bus 32. According to this scheme, bits 2–10 will include an address of a memory subsystem. Since the AD bus contains 32 bits, a burst transaction up to the length $2^{32}$ could be supported by the memory interface according to the present invention. The actual size of the counter in this example is limited to 9 bits, but is scalable to fit specific applications.

When the state machine included in the control unit 20 generates a count enable signal via line 42 and the ADS# signal is deasserted by the local bus master, both S0 and S1 will be set to 1 and thus, the multiplexer 40 will select the input D and route it to the latch 44. As one can see, input D is coupled to the output of adder 38. Moreover, adder 38 has the input B coupled to the output Q of the address register 44. The output Q of the register 44 will drive the input B of the adder 34 with the current address. The adder 38 will increment the current address received at the input B, by adding one to this address, and will thus generate the next address signal at its output. The next address signal is driven to the input D of the multiplexer 40. Upon the assertion of the count enable signal 42, the multiplexer 40 will select input D and on the next clock edge the register 44 will contain an incremented address. Accordingly, the burst address count 36 provides an incremented address under the control of the burst control circuit or the burst control state machine included in the control unit 20.

FIG. 3 illustrates in more detail the structure of the selecting device 12 illustrated in FIG. 1. Selecting device 12 includes a DRAM address multiplexer 350 having an output coupled to a dynamic memory bus 356. The DRAM multiplexer 350 has a first input coupled to a row address 352 and a second input coupled to a column address bus 354. The row address bus 352 and the column address bus 354 are coupled to the second internal bus 316. Multiplexer 350, in response to a DRAM row select signal during via line 358, a control gate of multiplexer 350, selectively routes one of the inputs to the DRAM address bus 356. Accordingly, the multiplexer 350 generates at its output either a DRAM row address driven by the bus 352 or a DRAM column address driven by the bus 354. The DRAM row select is a signal generated by the control unit 20 of FIG. 1.

Multiplexer 360 has an input receiving the DRAM address bus 356 and a second input receiving the SRAM address bus 362. Multiplexer 360 will selectively route at an output thereof either a static RAM address signal driven by the bus 362 or a dynamic RAM address signal driven by the bus 356 according to the SRAM select signal driven by the control unit 20 of FIG. 1 to a select input 363 of the multiplexer 360. Accordingly, selecting device 12 couples either the first internal bus 314 or the second internal bus 316 to the multiplexed address bus 304. Consequently, the memory interface according to the present invention, can support both a static and a dynamic memory subsystems by using a single address bus 304. Table 361 shows the correspondence in bit lines between the first and the second external bus. For example, if a DRAM column address is driven, then the bit line of the AD bus corresponding to ADD[10] will be routed to the bit line MA[0] of the MA bus.

Figure 4A:
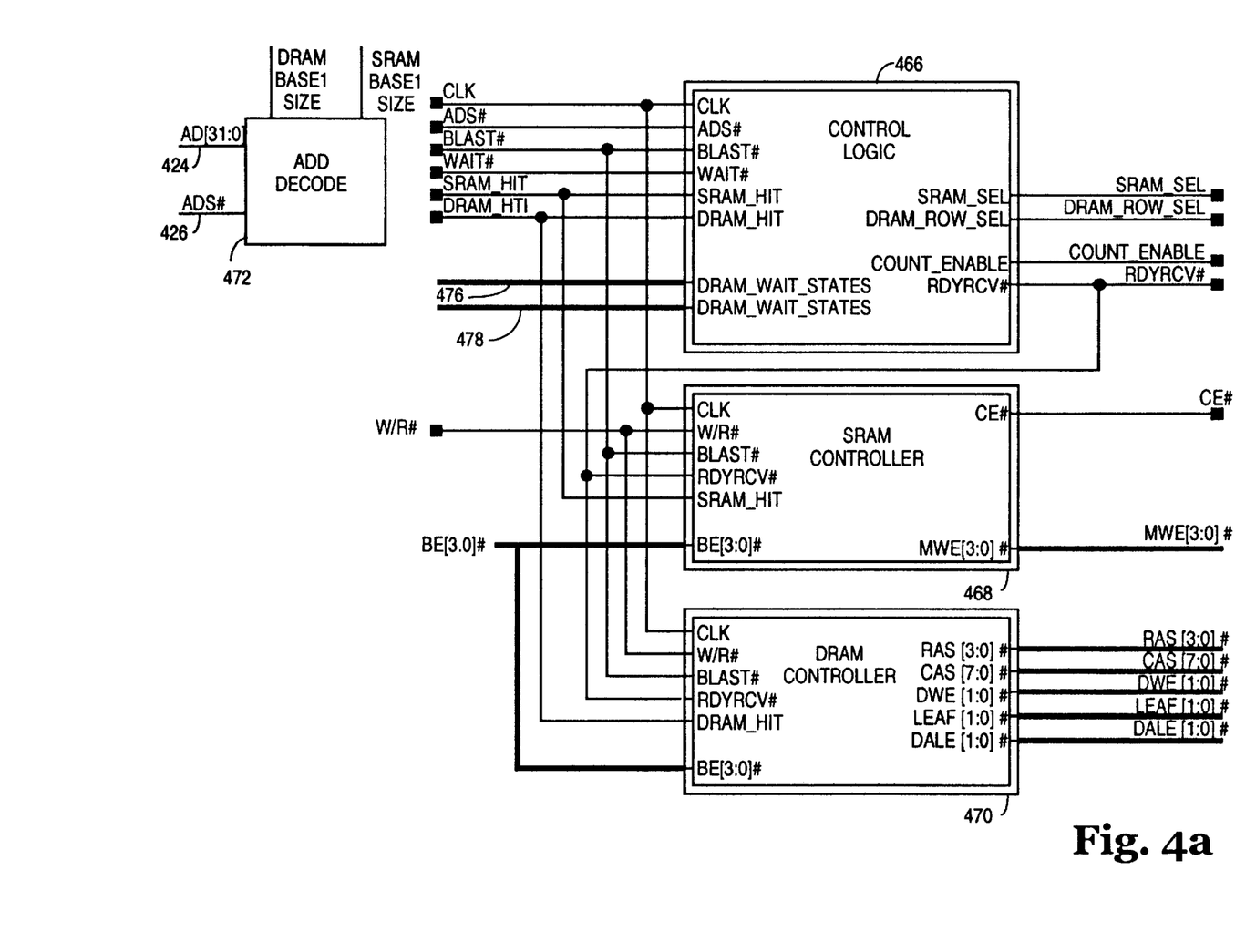
FIG. 4a shows an interface control unit of the memory interface device according to the present invention.

FIG. 4a illustrates in more detail the structure of the control unit 20 of FIG. 1. Control logic 466 is a circuit which provides the control logic of the memory interface device according to the present invention. This logic generates the signals SRAM select to the multiplexer 360 shown in FIG. 3, and DRAM row select to the multiplexer 352 also shown in FIG. 3. Additionally, the control logic 466 generates the signal count enable to the burst address counter 22 and a recovery signal RDYRCV. The input SRAM hit and the DRAM hit of the control logic 466 is coupled via lines SRAM and DRAM HIT to an address decode unit 472. The address decode unit 472 has an input coupled to the AD bus 424 and another input coupled to the ADS line 426. Additionally, the address decode unit 472 is coupled to a static memory address space register, not shown in this figure, which generates the signal SRAM base/size. Similarly, the address decode 472 is coupled to a dynamic memory address space register (not shown) which generates the signal DRAM base/size. The dynamic and static memory address space registers store, respectively, a dynamic memory address space and a static memory address space. The address decode unit 472 compares an address received via the AD bus 424 with the address spaces containing the dynamic and static memory address space registers. If the address signal received via the bus 424 corresponds to the dynamic memory address space or to the static memory address space, the address decode unit 472 generates the signals DRAM hit, respectively, SRAM hit at its output. In accordance with signals DRAM HIT and SRAM HIT, control logic 466 will generate the signals SRAM row select or DRAM row select.

The DRAM hit signal triggers the operation of a DRAM access state machine circuit (not shown) of control logic 466. The DRAM state machine in turn will generate the DRAM row select signal to the DRAM multiplexer 350 shown in FIG. 3. The DRAM memory access state machine typically tracks the row and column states of the dynamic memory access. According to whether the dynamic RAM state machine is in a row or a column state, the DRAM row select signal will switch between zero and one. Typically, in the first phase of an address cycle, a row address will be routed by the multiplexer 350 (FIG. 3) to its output. In the second phase, a column address will be routed by the multiplexer 350 (FIG. 3) to its output.

Figure 4B:
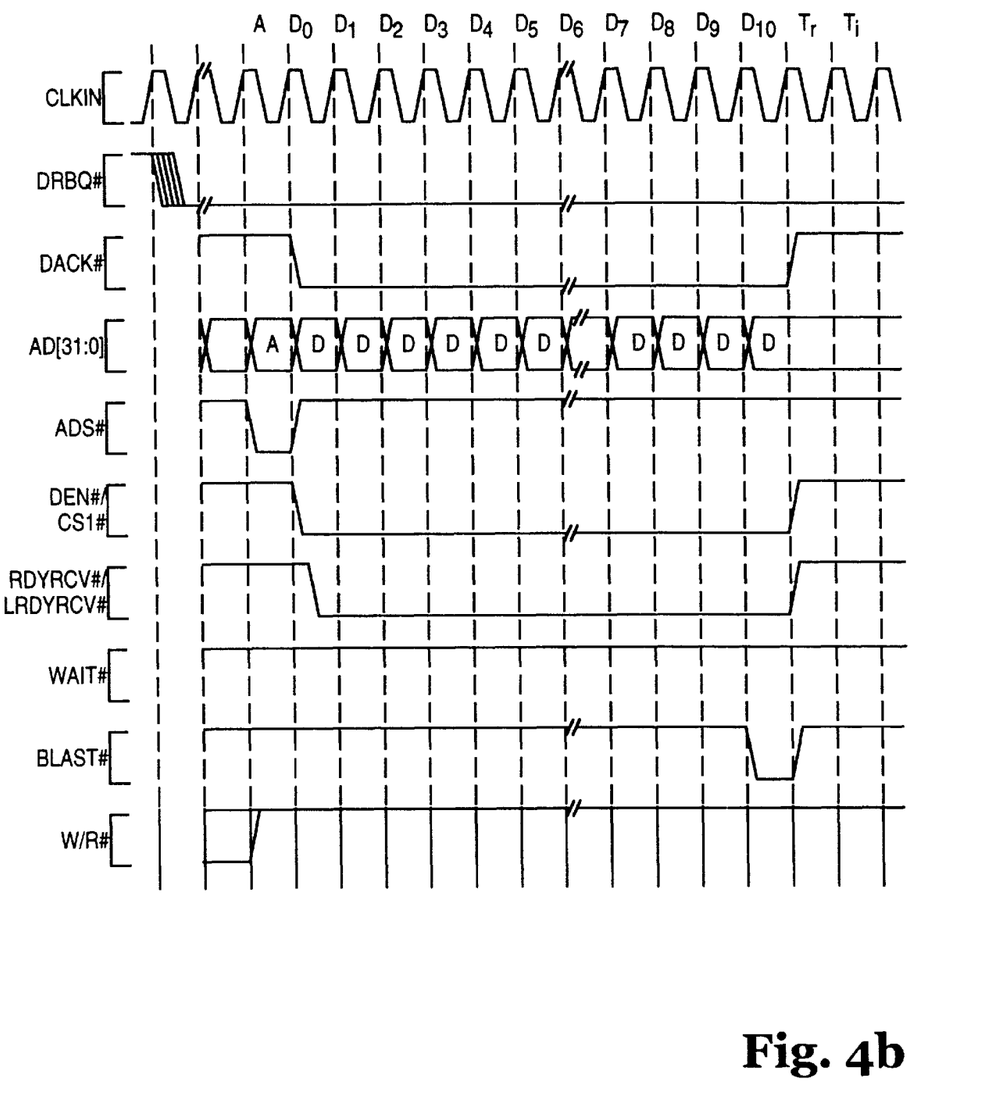
FIG. 4b shows a waveform diagram of a burst transaction supported by the memory interface device according to the present invention.

The control logic 466 is also coupled to a wait state configuration register (not shown). The wait state configuration register drives the lines DRAM wait state and SRAM wait state to the input of the control logic 466. The signals DRAM wait states and SRAM wait states, in conjunction with the signal WAIT# allows the control logic unit 466 to generate wait states. The ability to program wait states for each of the bus cycles allows the memory controller to support burst transactions to either SRAM or DRAM systems. FIG. 4b represents a write transaction to a DRAM with zero wait state profile. The burst access begins, in the address cycle, on the rising edge of the clock with the assertion of a valid address and of the ADS# signal. The interface control unit provides the incrementing address bits on the MA bus while the processors continues to drive an address on the AD bus. During the write transaction, the memory controller asserts the MWE[3:0]# signals which control write accesses to the SRAM devices. The CE[1]# signal is asserted for the duration of the memory access to ensure the AC characteristic of the memory device are met. W/R# signal is controlled by the processor and prevents the memory device's output from being gated onto the address/ data bus during the write cycle. The control unit 20 of FIG. 1 asserts the signal RDYRCV# to indicate that data has been accepted for a write transaction. The data is driven on AD(31:0) bus immediately following the address. The RDYRCV# signal is controlled by the control logic unit 466 which is programmed through a wait state register typically coupled to the SRAM wait states line 478 of FIG. 4a. The signal BLAST# is driven by the processor to indicate the last transfer in a burst access, and remains active as long as wait states are indicated by the RDYRCV# signal.

Going back to FIG. 4a, this figure further shows the DRAM controller 470 coupled to the DRAM subsystem via the signal RAS#, CAS#, DWE#, LEAF# and DALE. Typically the dynamic memory of the present invention (DRAM) may be organized in four banks of memory. The memory banks might be configured as non-interleaved or two-way interleaved depending on the memory types used. A memory controller which includes the memory interface device of the present invention can support three different types of DRAM: fast page mode (FPM), extended data out (EDO), and burst extended data out (BEDO). Memory address bus signals, row address strobe (RAS#), and column address strobe (CAS#) are provided via the multiplexed address bus MA. Typically, a row address is presented to the MA bus after the multiplexer 350 of FIG. 3 has selected such address during the ADS# cycle. An RAS# signal can be asserted on the rising edge of the clock following the ADS# cycle. The column address signal (CAS#) is presented to the MA bus on the next rising edge of the clock, and latched with the assertion of CAS#. The CAS# signal is asserted on the next falling edge of the clock presenting valid data to the address bus (not shown in this figure).

The present invention also provides an interface to one or two banks of interleaved DRAM. An interleaved bank is defined as a contiguous block of memory having independent odd and even leaves. Interleaved memory increases system performance by overlapping CAS# access times between leaves. The DRAM access state machine tracks the state of the current DRAM access via control inputs and sends control outputs to a DRAM address counter (for DRAM burst transactions), to the memory address multiplexer and to the output gate DALE. The DALE [1:0] output is designed to interface to an interleaved interface circuit (IIC) which selectively couples the MA bus to an even or an odd memory bank device (shown in FIG. 5).

Figure 5:
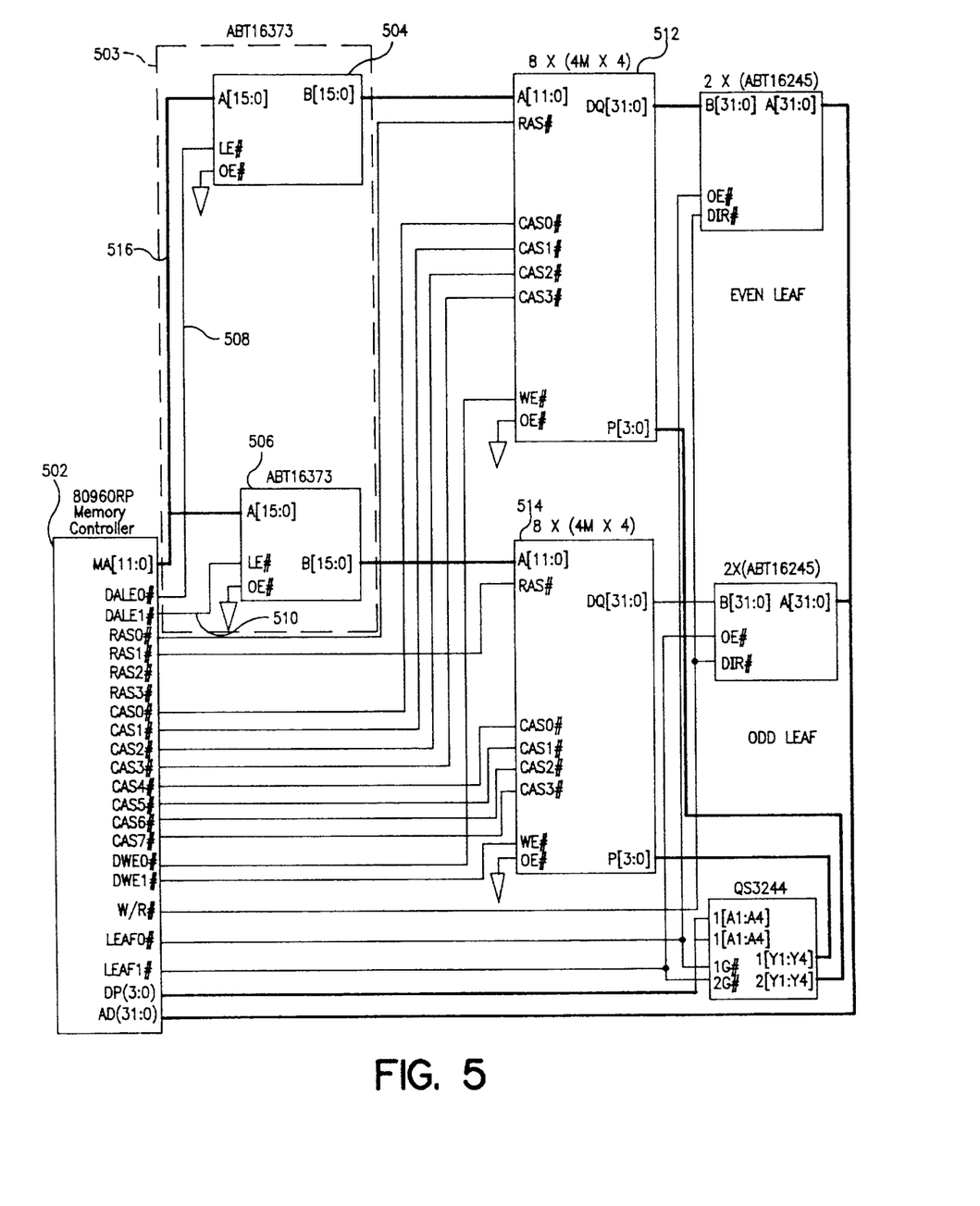
FIG. 5 shows a memory control unit and a system interface to an interleaved DRAM memory system.

FIG. 5 shows an interleaved interface circuit block diagram with a memory controller 502 which can include the logic circuits shown in FIGS. 1–4. This figure details both the required system interconnect, as well as the necessary external components. In this figure, the output pins DALE0 and DALE1 are coupled respectively to the interleaved interface circuit which is implemented, by way of non-limiting example, by latches 504 and 506. The output DALE0 is coupled thus to latch 504 via line 508, while the output DALE1 is coupled to latch 506 via line 510. Latch 504 is coupled to an even leaf 512, while latch 506 is coupled to an odd leaf 514. The latches 504 and 506 receive the signals DALE0 and DALE1 which control the latching of an address from the MA bus 516. An address can thus be driven to the even leaf or the odd leaf 514 without having to use an even and an odd MA bus routed from the memory controller 502 to the even and the odd leaves. The interleaved interface circuit in conjunction with the DRAM state machine controlling the output DALE0 and DALE1 allows the use of a single multiplexed address bus 516 without inserting wait states. This is contrary to current memory controller usage which relies on separate even and odd MA buses to support the leaves of an interleaved DRAM system. Prior art typically utilizes two independent MA busses—one for each leaf. It would be possible to reduce this to one bus with the addition of wait states (without the DALE lines). The DRAM devices, in each leaf, require address setup and hold times to operate correctly. Address hold is typically 10–20 ns and is referenced to the assertion of CAS#.

Without two busses, or the external latches of the present invention, the memory control unit can not increment the MA bus until this hold time is satisfied. As a result, the memory control unit cannot begin the next transaction directed to the opposite leaf. However, with the addition of DALE lines to control the external latches 504 and 506, one single MA bus can be held (satisfying the hold requirement) while the address to the opposite leaf is incremented in preparation for the next transaction.

Figure 6:
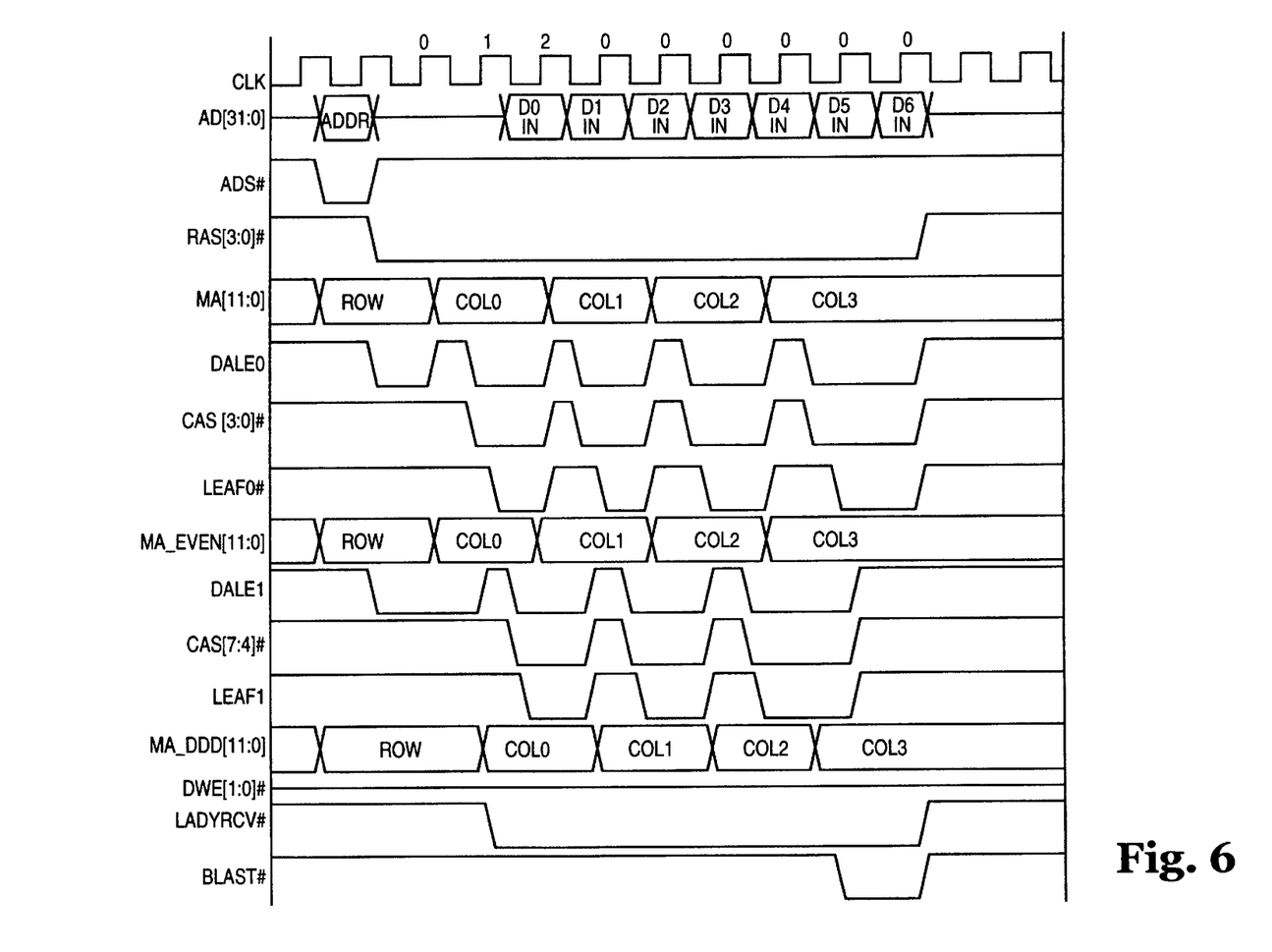
FIG. 6 illustrates a waveform diagram for a read operation in connection with the memory interface illustrated in FIG. 5.

FIG. 6 illustrates a waveform diagram for a read operation in connection with the memory interface illustrated in FIG. 5. As one can see, a read access to the interleaved memory can be performed with a 2-0-0-0-0-0-0 wait state profile. As one can see, there are two wait states inserted between the address phase and the data phase, and no wait states between the data.

Figure 7:
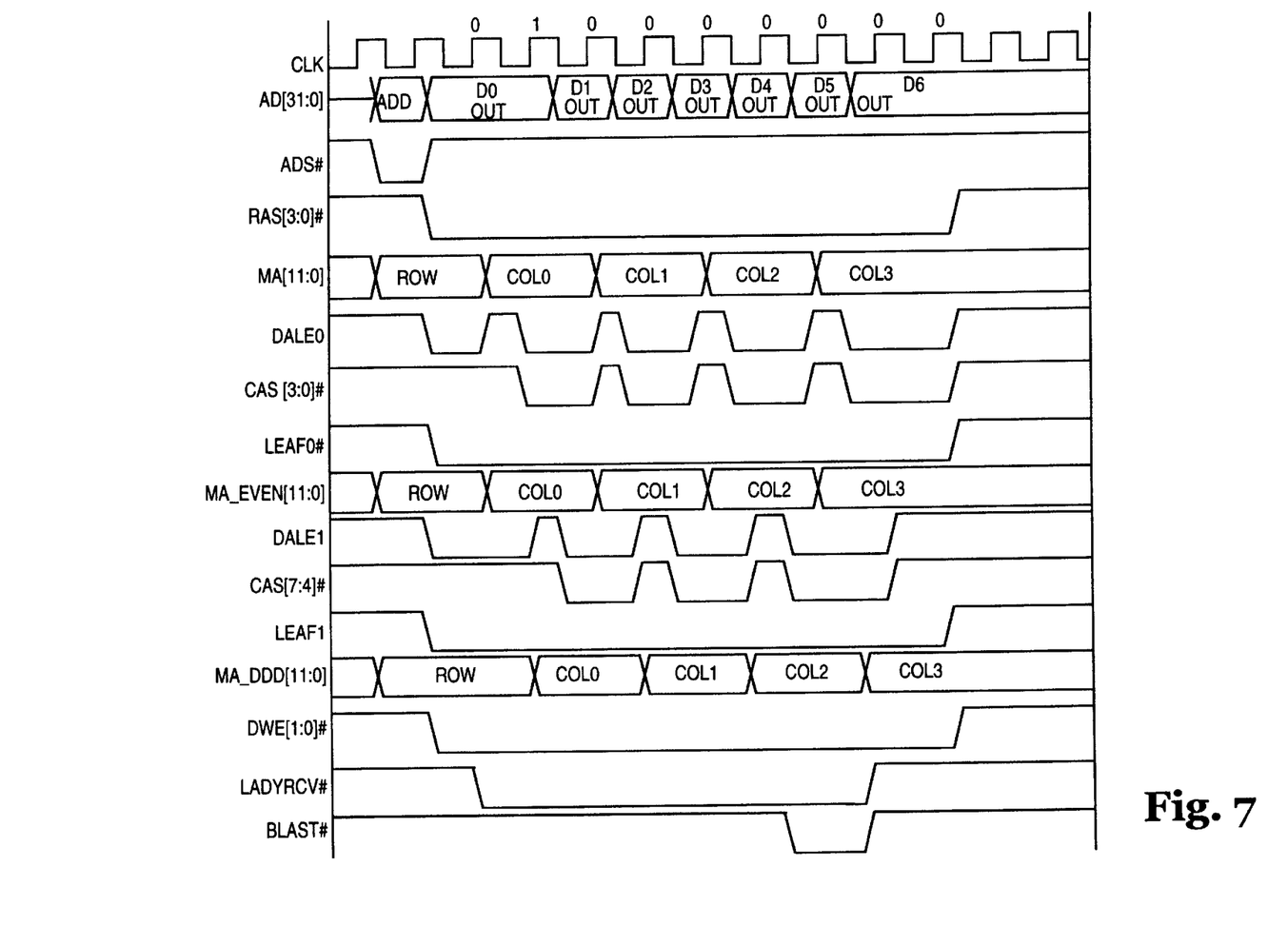
FIG. 7 illustrates a waveform diagram for a write access to an interleaved system which utilizes the memory interface illustrated in FIG. 1.

FIG. 7 illustrates a waveform diagram for a write access to an interleaved system which utilizes the memory interface illustrated in FIG. 5. Seven word burst is written to the memory bank, the even bank being accessed first.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A memory interface device to interface between a first external bus and a second external bus, said memory interface device comprising:

a first internal bus;

a second internal bus;

an interface control unit (ICU) having an input, coupled to said first external bus, to receive address and control signals, said ICU having an output, coupled to said first and second internal busses to generate to said first internal bus burst address signals and to generate to said second internal bus address latch signals in response to said address and control signals; and a selecting device coupled to said first and second internal busses to generate, based on said burst address signals and said address latch signals, first and second addresses corresponding to first and second memory subsystems, respectively, that are coupled to said second external bus.

2. The memory interface device of claim 1 wherein said selecting device has a select input to receive a select signal from said ICU, said selecting device coupling one of said first and second addresses to said second external bus, in response to said select signal.

3. The memory interface device of claim 1 wherein said ICU includes an address latch coupled to said first external bus to latch an address signal from said first external bus, said latch having an input and an output.

4. The memory interface device of claim 3 wherein said ICU includes a burst address counter device, coupled to said address latch, to generate said burst address signals, said burst address counter device having a control input.

5. The memory interface device of claim 4 wherein said ICU further includes a burst control circuit having an input, to receive said control signals, and an output to generate a burst control signal to said control input of said burst address counter device.

6. The memory interface device of claim 4 wherein said burst address counter device includes an adder with an input to receive an address and an output, said burst address counter further including a multiplexer having an output coupled to said input of said address latch, said multiplexer having an input coupled to said output of said adder.

7. The memory interface device of claim 6 wherein said multiplexer of said burst address counter further has a select gate to receive said burst control signal.

8. The memory interface device of claim 7 further having a control logic circuit, coupled to said burst control circuit, to generate wait states to said burst control circuit.

9. The memory interface device of claim 7 further including and address decode circuit having an input couple to said first external bus and an output coupled to a select input of a memory address multiplexer, first and second registers, coupled to said address decode circuit to store respectively a dynamic memory address space and a static memory space, wherein said address decode circuit determines whether an address signal received via said first external bus corresponds to said dynamic memory address space or to said static memory address space and to generate, responsive to this determination, said select signal to said select input of said memory address multiplexer.

10. The memory interface of claim 1 wherein said first external bus is a 80960JX local bus, said second bus is a memory bus, said first memory subsystem is a static memory subsystem, said second memory subsystem is a dynamic memory subsystem, and said selecting device is a memory address multiplexer.

11. The memory interface device of claim 10 further including a dynamic memory address multiplexer having first and second inputs and an output, said memory interface further including a row address bus and a column address bus coupled respectively to said first and second inputs of said dynamic memory multiplexer, each of said row and column busses being coupled to said local bus.

12. A memory interface device for interfacing between a first bus and a second bus coupled to a dynamic memory subsystem including an even memory bank device and an odd memory bank device, said memory interface device comprising:

a memory control unit (MCU), coupled to said first bus and to said second bus, to generate to said second bus a memory address and to generate even and odd bank select signals; and an interleaved interface unit (IIU), coupled to said second bus, including odd and even latches coupled to said odd and even bank select signals and to said odd and even memory bank devices respectively, said odd latch configured to latch therein said memory address if said odd bank select signal is asserted, said even latch configured to latch therein said memory address signal if said even bank select signal is asserted.

13. The memory interface device of claim 12 wherein said bank select signals includes an even bank select signal and an odd bank select signal.

14. The memory interface device of claim 13 wherein said IIU includes an even latch and an odd latch, each of said latches including a control gate for coupling to, respectively, said even and said off bank select signals.

15. In a computer system having a processor, a local bus coupled to said processor, a dynamic memory subsystem including an even memory bank device and an odd memory bank device, a memory bus coupled to said dynamic memory subsystem, and a memory interface device for interfacing between said local bus and said memory bus, said memory interface device comprising:

a memory control unit (MCU), coupled to said local bus and to said memory bus, for generating memory bank select signals; and an interleaved interface unit (IIU), coupled to said memory bus, said IIU having a control gate for receiving said memory bank select signals and responsive thereto for selectively coupling said memory bus to said even memory bank device or to said odd memory bank device.

16. The memory interface device of claim 15 said memory bank select signals includes an even bank select signal and an odd bank select signal.

17. The memory interface device of claim 16 wherein said IIU includes an even latch and an odd latch, each of said latches including a control gate to couple to, respectively, said even and said odd bank select signals.

18. A memory interface to interface between first and second busses, said second bus coupled to first and second memory subsystems, the memory interface comprising:

an interface control unit (ICU) to receive an address from said first bus and responsively to generate first information indicating which of said first and second subsystems is addressed; and a selecting device to receive said address and said first information, based on said address to generate first and second addresses, corresponding to said first and second memory subsystems respectively, and based on said first information to selectively drive one of said first and second addresses to said second bus.

19. The memory interface of claim 18 wherein said selecting device includes a first multiplexer to receive said first and second addresses and based on said first information to selectively drive one of said first and second addresses to said second bus.

20. The memory interface of claim 18 wherein said selecting device configured to generate, based on said address, a row and a column address, corresponding to said second memory subsystem.

21. The memory interface of claim 20 wherein said ICU configured to generate second information indicating which of a row and a column of said second memory subsystem is addressed.

22. The memory interface of claim 21 wherein said second address is generated by selecting, based on said second information, one of said row and column addresses.

23. The memory interface device of claim 18 wherein said ICU includes an address latch coupled to first bus to latch a first portion of said address from said first bus.

24. The memory interface device of claim 23 wherein said ICU includes a burst address counter device, coupled to said first bus to latch a second portion of said address and responsively to generate a burst address.

25. The memory interface device of claim 24 wherein said ICU further includes a burst control circuit to receive said address and responsively to generate a burst control signal to said burst address counter device.

26. The memory interface device of claim 25 wherein said burst address counter device includes an adder to receive an address and to increment said address.

27. The memory interface device of claim 26 wherein said burst address counter device includes a burst address latch having an input and an output, and a multiplexer having an output coupled to said input of said burst address latch, said multiplexer having an input coupled to said output of said adder, said burst address latch providing at said output thereof said burst address.

28. The memory interface device of claim 27 wherein said multiplexer of said burst address counter further has a select gate for receiving said burst control signal.

* * * * *